United States Patent [19]

Miller

[11] 3,996,809
[45] Dec. 14, 1976

[54] DRIVE CHAIN HAVING A DISENGAGING LINK

[75] Inventor: Walter L. Miller, Fort Atkinson, Wis.

[73] Assignee: Butler Manufacturing Company, Kansas City, Mo.

[22] Filed: Sept. 26, 1975

[21] Appl. No.: 616,924

[52] U.S. Cl. .................... 74/229; 74/250 R; 192/129 R
[51] Int. Cl.² .................. F16H 7/06; F16G 13/06
[58] Field of Search ........ 74/245 R, 229, 37, 250 R, 74/222, 250 C; 192/129 R; 254/168, 192; 59/35 CP, 91; 198/232

[56] References Cited
UNITED STATES PATENTS 3,924,488  12/1975  Fox ........................ 74/37

*Primary Examiner*—Samuel Scott
*Assistant Examiner*—Allan R. Burke
*Attorney, Agent, or Firm*—Lowe, Kokjer, Kircher, Wharton & Bowman

[57] ABSTRACT

A chain of the type that is used in a reciprocating chain drive. The majority of the chain is constructed of conventional links that mesh with and are driven by rotating sprockets. A specially constructed link is included in the chain to disengage from the sprockets if the reversal controls of the chain drive mechanism malfunction. The special disengaging link is provided with an inclined plate which cams against the sprocket teeth to divert the chain off to the side of the sprocket if the disengaging link reaches the sprocket due to a control malfunction.

6 Claims, 4 Drawing Figures

DRIVE CHAIN HAVING A DISENGAGING LINK

BACKGROUND AND SUMMARY OF THE INVENTION

This invention relates in general to a chain of the type that is used in a chain drive mechanism to drive reciprocating equipment. More particularly, the invention is concerned with a chain that includes a specially constructed link that automatically disengages the chain from the sprocket in the event of a malfunction in the reversal or stop controls of the mechanism.

Chain drive mechanisms are widely used to carry trolleys of various types, scrapers, and other equipment in reciprocating motion. Normally, the direction of rotation of the drive sprocket in the chain drive is periodically reversed by controls that may be operated electrically, mechanically, or manually. Controls for stopping the chain are also provided. If the chain should fail to reverse or stop as intended due to a malfunction in the reversal or stop controls, the chain will move in one direction to a greater extent than intended, and severe damage to the chain drive and the equipment it carries is likely to result.

It is the primary object of the present invention to provide, in a chain of the type used in reciprocating chain drive mechanisms, a specially constructed link that automatically disengages the chain from the sprockets if the reversal or stop controls should fail to reverse or stop the chain.

It is another object of the invention to provide, in a chain of the character described, a specially constructed link which disengages the chain only when necessary and which does not interfere with the normal reciprocating motion of the chain.

A further object of the invention is to provide a chain having a specially constructed disengaging link that acts to automatically cam the chain off to the side of the sprockets when the link contacts the sprocket teeth. The camming action of the disengaging link assures that the chain will be diverted off of the sprocket in a simple and reliable manner if the reversal or top controls should malfunction.

Yet another object of the invention is to provide a disengaging chain link of the character described that may be readily incorporated into a chain constructed with standard links.

An additional object of the invention is to provide a chain of the character described that is constructed simply and economically.

Other and further objects of the invention, together with the features of novelty appurtenant thereto, will appear in the course of the following description.

DETAILED DESCRIPTION OF THE INVENTION

In the accompanying drawing which forms a part of the specification and are to be read in conjunction therewith and in which like reference numerals are used to indicate like parts in the various views.

Figure 1:
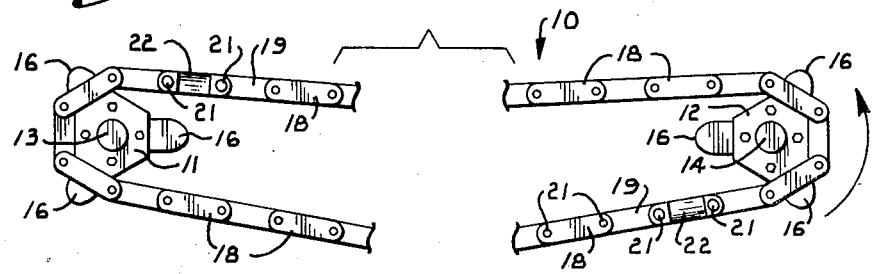
FIG. 1 is a side elevational view of a typical reciprocating chain drive mechanism in which the chain of the present invention is employed, the broken away portions indicating continuous chain length.

Referring now to the drawing in detail, FIG. 1 illustrates a typical reciprocating chain drive mechanism in which an endless chain 10 constructed according to the invention is employed. The chain drive mechanism includes a pair of sprockets 11 and 12 around which chain 10 is tightly trained. Sprockets 11 and 12 are mounted on shafts 13 and 14, respectively, and one of the shafts is normally rotatively driven by a motor or other means (not shown) in order to advance the chain. In the chain drive illustrated, shaft 14 is the driven shaft while shaft 13 and sprocket 11 are idlers. Of course both shafts 13 and 14 could be driven shafts. In reciprocating chain drives, reversal controls, (not shown) are provided which operate conventionally to reverse the direction of rotation of shaft 14 periodically in order to reciprocate chain 10 back and forth. Stop controls (not shown) are also provided to stop the movement of the chain completely.

Ordinarily, a second chain (not shown) parallel to chain 10 will be mounted on a second pair of sprockets (also not shown) which are mounted on shafts 13 and 14 at locations spaced to the side of sprockets 11 and 12. Reciprocating equipment (not shown) of any type such as a trolley, carriage, scraper, or the like is mounted to the two parallel chains, usually extending between the upper runs of the chains. This equipment will be driven back and forth in reciprocating motion between sprockets 11 and 12 as the reversal controls periodically reverse the direction of rotation of shaft 14.

Each sprocket 11 and 12 is constructed conventionally with thin peripheral teeth 16 extending outwardly from the sprocket body. The teeth 16 act to engage the links of chain 10 in order to advance the chain as the sprockets rotate.

Figure 3:
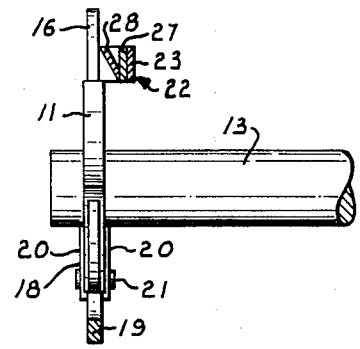
FIG. 3 is a fragmentary elevational view, partially in cross section, taken generally along line 3—3 of FIG. 2 in the direction of the arrows.

Referring now more particularly to the construction of chain 10, a plurality of drive links 18 and connector bars 19 are connected end to end in alternative fashion, with a bar 19 between each pair of links 18. As best illustrated in FIG. 3, each link 18 comprises a pair of flat side plates 20 which are spaced apart in parallel relationship by a pair of pins 21 which extend between each pair of plates 20 near the opposite ends thereof. The spacing between plates 20 is slightly greater than the thickness of sprocket teeth 16 so that the teeth will fit between the side plates.

Each connector bar 19 is a flat plate member of lesser thickness than the distance between side plates 20. Each bar 19 is pivoted near its ends to the pins 21 of successive links 18. The pivotal connection between links 18 and bars 19 permits chain 10 to flex as required about each pin 21. The ends of each bar 19 fit between side plates 20, and the sprocket teeth 16 act against the end portions of the bars 19 in order to advance the chain as sprockets 11 and 12 rotate.

Chain 10 further includes a pair of disengaging links which are designated by numeral 22. As best shown in FIG. 1, the links 22 are connected between selected pairs of connector bars 19 in place of the links 18 that would normally be at these locations in an ordinary chain construction. Links 22 act to disengage the chain from sprockets 11 and 12 if they should reach the sprocket teeth, and the two links 22 are therefore spaced apart from one another half the entire length of the chain.

Figure 4:
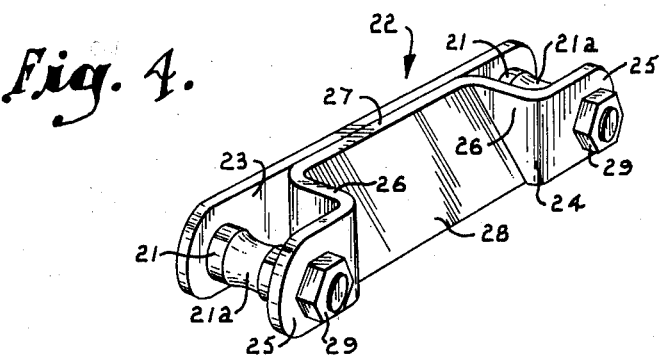
FIG. 4 is a perspective view on a still larger scale illustrating one of the disengaging links included in the chain.

The link 22 on the lower run of chain 10 is illustrated in detail in FIG. 4. A flat plate 23 forms one side of each link 22. A channel shaped member 24 having flanges 25 on its ends is secured to plate 23 by a pair of the pins 21. Pins 21 extend between each flange 25 and the corresponding end of plate 23 to space the plate 23 from flanges 25. The spacing between plate 23 and flanges 25 is equal to the spacing between the side plates 20 of the links 18 so that identical pins 21 may be used throughout the chain. The central portion of each member 24 is offset or recessed inwardly of flanges 25. Integral legs 26 extend toward plate 23 at right angles from the ends of flanges 25, and a flat central web 27 extends along the surface of plate 23 between the ends of legs 26. The web 27 of each member 24 is thus recessed inwardly of flanges 25.

A flat plate 28 is welded in the recess area of each member 24 at an inclined angle. In the link 22 shown in FIG. 4 which is the link on the lower run of chain 10, plate 28 is welded to legs 26 at its side edges and to the upper edge of web 27 at its upper edge. As plate 28 extends downwardly, it also extends outwardly or away from web 27 at an inclined angle. The angle of inclination of plate 28 relative to web 27 is preferably in the range of from 20° to 40° for the most effective and reliable results.

The link 22 on the upper run of chain 10 is constructed identically to the lower link 22 but is inverted from the orientation shown in FIG. 4 for the lower link. In other words, the plate 28 on the upper link 22 extends outwardly or away from web 27 as it extends upwardly, as best shown in FIG. 3.

One end of each pin 21 is preferably threaded, and a nut 29 (FIG. 4) is threaded onto this end of the pin to secure the components of each link 18 and 22 together and to attach the connector bars 19 to the links. The pins 21 of links 22 pivotally connect to the ends of bars 19, with one end of the connector bar located between plate 23 and flange 25. The central portion of each pin 21 is preferably reduced in diameter in a smooth manner as shown at 21a in FIG. 4 in order to facilitate the pivoting of bar 19.

In use, chain 10 drives the reciprocating equipment (not shown) back and forth in response to the periodic reversal of the rotational direction of sprockets 11 and 12. In FIG. 1 the directional arrow indicates the direction of rotation of sprocket 12, and it is noted that the two disengaging links 22 have not reached sprockets 11 and 12. When the chain reaches the approximate position shown in FIG. 1, the direction of rotation of sprocket 12 will ordinarily be reversed from that indicated by the directional arrow so that the upper run of chain 10 will begin moving to the right and the lower run of the chain will begin moving to the left. When the chain has moved in this direction to a position where the upper link 22 is near sprocket 12 and the lower link 22 is near sprocket 11, the direction of rotation of sprocket 12 will again be reversed before either link 22 reaches either sprocket. In this manner, the equipment carried on chain 10 will reciprocate back and forth without either link 22 engaging a sprocket in normal operation.

Figure 2:
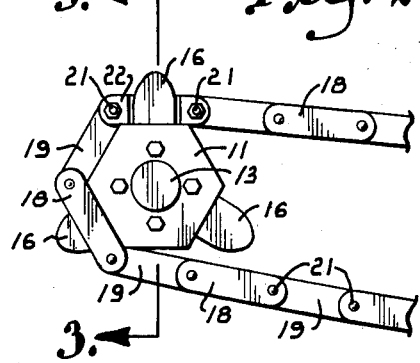
FIG. 2 is a fragmentary side elevational view on an enlarged scale illustrating one of the disengaging links of the chain having reached one of the sprocket teeth.

However, if the reversal or stop controls should malfunction and fail to reverse or stop the rotation of sprocket 12 as intended, the respective links 22 will come into engagement with the teeth 16 on sprockets 11 and 12 shortly after the ordinary extreme position of the chain has been passed. This is shown in FIG. 2 where the upper run of the chain has moved excessively to the left due to failure of the reversal or stop controls.

When this occurs, one of the sprocket teeth 16 initially engages the inclined plate 28 at a location approximately midway of the height of the plate. Due to the inclined angle of plate 28 and the tension of chain 10, the plate slides off of the tooth 16 in a camming manner until it has been diverted completely off to the side of the tooth, as best shown in FIG. 3. This has the effect of disengaging the entire chain from sprocket 11 since the following drive links 18 will follow the path of link 22 and pass to the side of the sproket teeth. As a result, chain 10 will not advance further, and the chain drive and the reciprocating equipment will not be subjected to damage despite the failure of the controls and the continued rotation of the sprocket.

At the same time, the camming action of plate 28 on the lower link 22 against one of the teeth of sprocket 12 diverts the lower link 22 to the side of sprocket 12 and disengages the chain from this sprocket in the manner described above. Accordingly, the chain will be stopped even if both sprockets continue to rotate.

Of course, if chain 10 should move excessively in the opposite direction, the upper link 22 will effect disengagement of the chain from sprocket 12, and the lower link will disengage the chain from sprocket 11.

While the chain has been illustrated and described as having two disengaging links 22, it is contemplated that in some cases only one link 22 will be included in the chain since this single link would eventually reach either sprocket 11 and 12 to disengage the chain therefrom in the event of a control malfunction. In addition, in cases where the sprockets are of different construction or size than the sprockets illustrated and have teeth that are spaced more closely together, it may be necessary or desirable to provide two or more of the disengaging links 22 as adjacent links of the chain so that the adjacent disengaging links 22 will be able to disengage the chain from adjacent sprocket teeth simultaneously.

Drive chains are commonly employed in various configurations such as being trained around a large number of sprockets or rollers that are mounted at various offset locations. This allows a single long chain to be used to drive equipment such as two or more scrapers in different work areas. The present invention contemplates this and is intended to include within its scope drive chains that are trained around any number of sprockets and/or rollers in any configuration. Of course, the location and number of the disengaging links 22 that will be included in the chain will depend on the configuration of the chain and the number and location of the sprockets from which the chain is to be disengaged.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A chain adapted for mounting on a toothed sprocket to move in reciprocating motion, said chain comprising;
   a plurality of drive links interconnected with one another, each drive link having means engageable with the sprocket teeth to advance the chain in response to movement of the sprocket; and
   a disengaging link connected between selected drive links, said disengaging link including means interacting with the sprocket teeth upon contact therewith to divert the disengaging link off to the side of said teeth, thereby disengaging the chain from said sprocket.

2. A chain as set forth in claim 1, wherein said interacting means comprises a cam surface on said disengaging link engageable with said sprocket teeth to divert said disengaging link off to the side of said teeth.

3. A chain as set forth in claim 2, wherein said cam surface is oriented at an inclined angle relative to the plane of said sprocket teeth.

4. A chain as set forth in claim 2, wherein said disengaging link includes a recessed member presenting a recess therein, said cam surface being located within said recess.

5. A chain as set forth in claim 4, including a substantially flat plate mounted within said recess at an inclined angle relative to the plane of said sprocket teeth to provide said cam surface.

6. A chain as set forth in claim 1, wherein said drive links are interconnected to form the chain in an endless manner, and including a second disengaging link connected between selected drive links at a location spaced substantially half the chain length from the first mentioned disengaging link, said second disengaging link including means interacting with the sprocket teeth upon contact therewith to divert the second disengaging link off to the side of said teeth.

* * * * *